United States Patent
Katsuya

(10) Patent No.: US 12,483,070 B2
(45) Date of Patent: Nov. 25, 2025

(54) NON-CONTACT POWER TRANSMISSION SYSTEM

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/741,832

(22) Filed: Jun. 13, 2024

(65) Prior Publication Data

US 2024/0429748 A1    Dec. 26, 2024

(30) Foreign Application Priority Data

Jun. 26, 2023 (JP) .................................. 2023-104429

(51) Int. Cl.
*H02J 50/12* (2016.01)

(52) U.S. Cl.
CPC .................... *H02J 50/12* (2016.02)

(58) Field of Classification Search
CPC ........ H02J 50/12; H02J 50/80; H02M 1/0003; H02M 3/33592
See application file for complete search history.

(56) References Cited

U.S. PATENT DOCUMENTS

| | | | | |
|---|---|---|---|---|
| 2011/0204723 A1* | 8/2011 | Irish | ......... | H02J 50/40 307/104 |
| 2022/0149714 A1* | 5/2022 | Phadke | .......... | H02M 1/08 |
| 2022/0250487 A1* | 8/2022 | Mao | ......... | B60L 53/65 |
| 2024/0178921 A1* | 5/2024 | Koma | ............... | H04B 10/6164 |

FOREIGN PATENT DOCUMENTS

| | | |
|---|---|---|
| JP | 11-069802 | 3/1999 |
| JP | 2001-309580 | 11/2001 |
| JP | 2001309580 A * | 11/2001 |
| JP | 2013-520957 | 6/2013 |
| JP | 2023-500133 | 1/2023 |
| WO | 2021/029018 | 2/2021 |

OTHER PUBLICATIONS

Japanese Office Action for Japanese Patent Application No. 2023-104429 mailed Jan. 28, 2025.

\* cited by examiner

*Primary Examiner* — Rexford N Barnie
*Assistant Examiner* — Michael J Warmflash
(74) *Attorney, Agent, or Firm* — Amin, Turocy & Watson, LLP

(57) ABSTRACT

A non-contact power transmission system includes a power reception unit, a received power conversion unit, a current sensor, and a control device. The power reception unit includes a secondary side coil for receiving AC power transmitted in a non-contact manner from a primary side coil of a power transmission device. The received power conversion unit converts AC power received by the power reception unit into DC power. The current sensor detects a current flowing between the power reception unit and the received power conversion unit. The control device executes a synchronous rectification operation by synchronously driving a plurality of switching elements of the received power conversion unit in accordance with a phase of the current when a detection value of a current output from the current sensor is equal to or larger than a predetermined threshold.

2 Claims, 7 Drawing Sheets

NON-CONTACT POWER TRANSMISSION SYSTEM

CROSS-REFERENCE TO RELATED APPLICATION

Priority is claimed on Japanese Patent Application No. 2023-104429, filed Jun. 26, 2023, the content of which is incorporated herein by reference.

BACKGROUND OF THE INVENTION

Field of the Invention

The present invention relates to a non-contact power transmission system.

Description of Related Art

In recent years, in order to be able to ensure access to affordable, reliable, sustainable, and modern energy for more people, research and development related to charging and power supply with respect to vehicles equipped with a secondary battery contributing to energy efficiency has been carried out.

In the related art, regarding non-contact power transmission, a system that switches a power reception side rectification element between ON and OFF depending on whether or not a current detected on a power reception side is equal to or larger than a predetermined threshold is known (for example, refer to the following Patent Document 1).

[Patent Document 1] Japanese Unexamined Patent Application, First Publication No. 2001-309580

SUMMARY OF THE INVENTION

Regarding technologies related to charging and supplying power to vehicles equipped with a secondary battery, when non-contact power transmission is performed with respect to a vehicle, it is desired to reduce a loss in a power reception side rectification operation and reduce a required cooling capability. For example, in non-contact power transmission systems according to the foregoing technologies in the related art, since rectification elements are not turned on until a power reception side current is equal to or larger than a predetermined threshold, a current waveform turns into a distorted shape from a sinusoidal wave shape, causing a problem that rectification efficiency cannot be improved.

An aspect according to the present invention has been made in consideration of such circumstances, and an object thereof is to provide a non-contact power transmission system capable of reducing a loss in a power reception side rectification operation and reducing a required cooling capability. Further, this ultimately contributes to energy efficiency.

In order to resolve the foregoing problems and achieve the objects, the present invention employs the following aspects.

(1) A non-contact power transmission system according to an aspect of the present invention includes a power reception unit that has a coil for receiving AC power transmitted in a non-contact manner from a power transmission device, a power conversion unit that has a plurality of switching elements and a plurality of rectification elements connected to the coil and converts the AC power received by the power reception unit into DC power, a current sensor that detects a current flowing between the power reception unit and the power conversion unit, and a control device that controls switching operations of the plurality of switching elements on the basis of a detection value of the current output from the current sensor. The control device causes the power conversion unit to execute a synchronous rectification operation of rectifying the AC power by synchronously driving the plurality of switching elements in accordance with a phase of the current when the detection value of the current is equal to or larger than a predetermined threshold.

(2) According to the foregoing aspect (1), the control device may prohibit the synchronous rectification operation and may permit an operation of rectifying the AC power using the plurality of rectification elements when the detection value of the current is smaller than the predetermined threshold.

(3) According to the foregoing aspect (1) or (2), the control device may halt the synchronous rectification operation and may shift the power reception unit and the power conversion unit to a standby state when the detection value of the current is smaller than the predetermined threshold while the synchronous rectification operation is executed.

According to the foregoing aspect (1), the control device that starts execution of the synchronous rectification operation in accordance with the predetermined threshold with respect to a current and controls a timing of a switching operation in synchronous rectification in accordance with the phase of a current is provided, and therefore a loss in a power reception side rectification operation and a required cooling capability can be reduced.

In the case of the foregoing aspect (2), switching between the rectification operation performed by the plurality of rectification elements and the synchronous rectification operation can be set in accordance with the predetermined threshold with respect to a current without requiring a signal for instructing the switching operation, and therefore the synchronous rectification operation can be appropriately executed even when a moving object such as a vehicle equipped with the power reception unit is moving.

In the case of the foregoing aspect (3), the synchronous rectification operation can be halted and a shift to the standby state can be performed when a moving object such as a vehicle equipped with the power reception unit leaves a section of power transmission, and therefore appropriate operation switching can be performed.

DETAILED DESCRIPTION OF THE INVENTION

Hereinafter, a non-contact power transmission system according to an embodiment of the present invention will be described with reference to the accompanying drawings.

Figure 1:
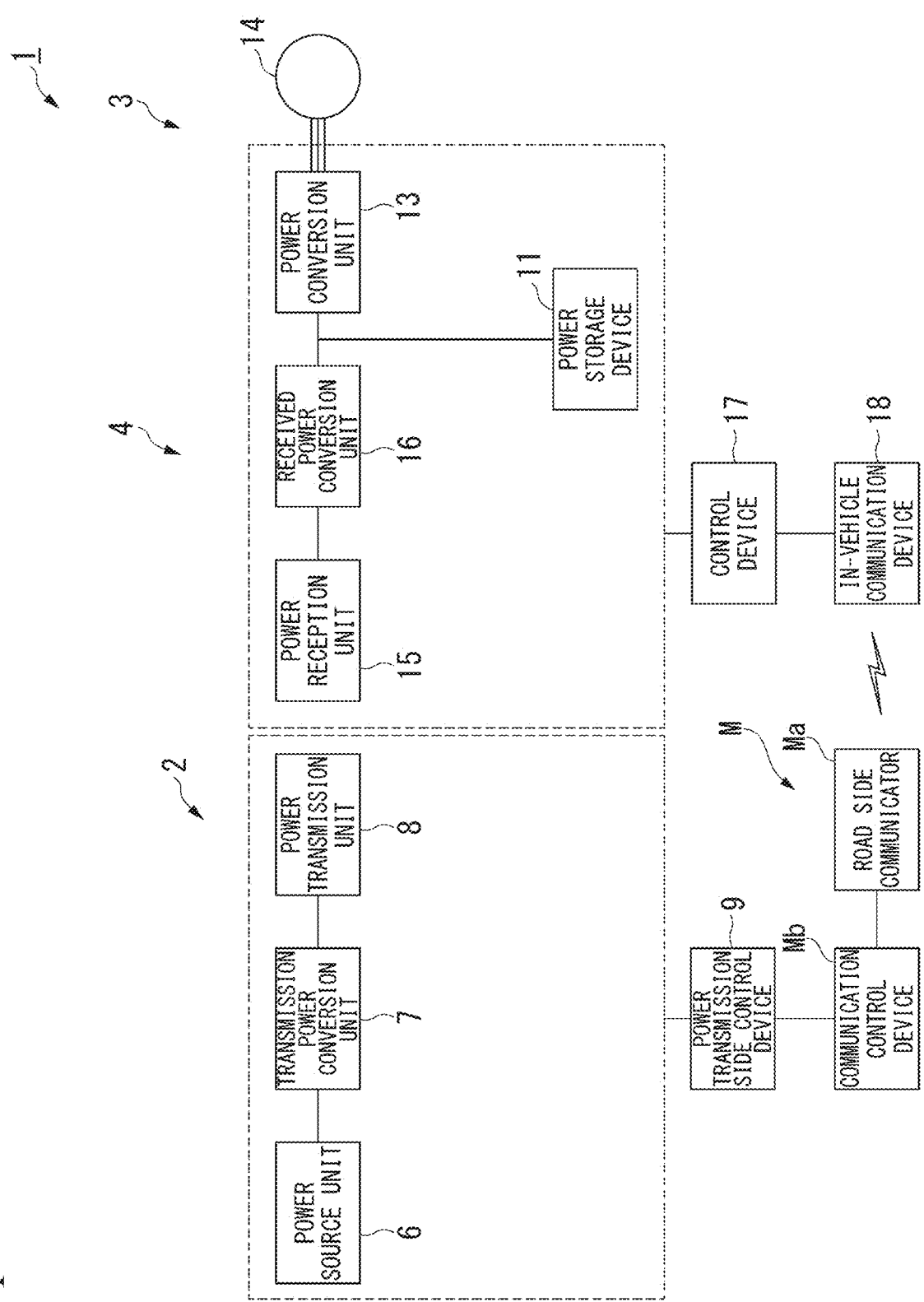
FIG. 1 is a view showing a constitution of a non-contact power transmission system according to an embodiment of the present invention.
Figure 2:
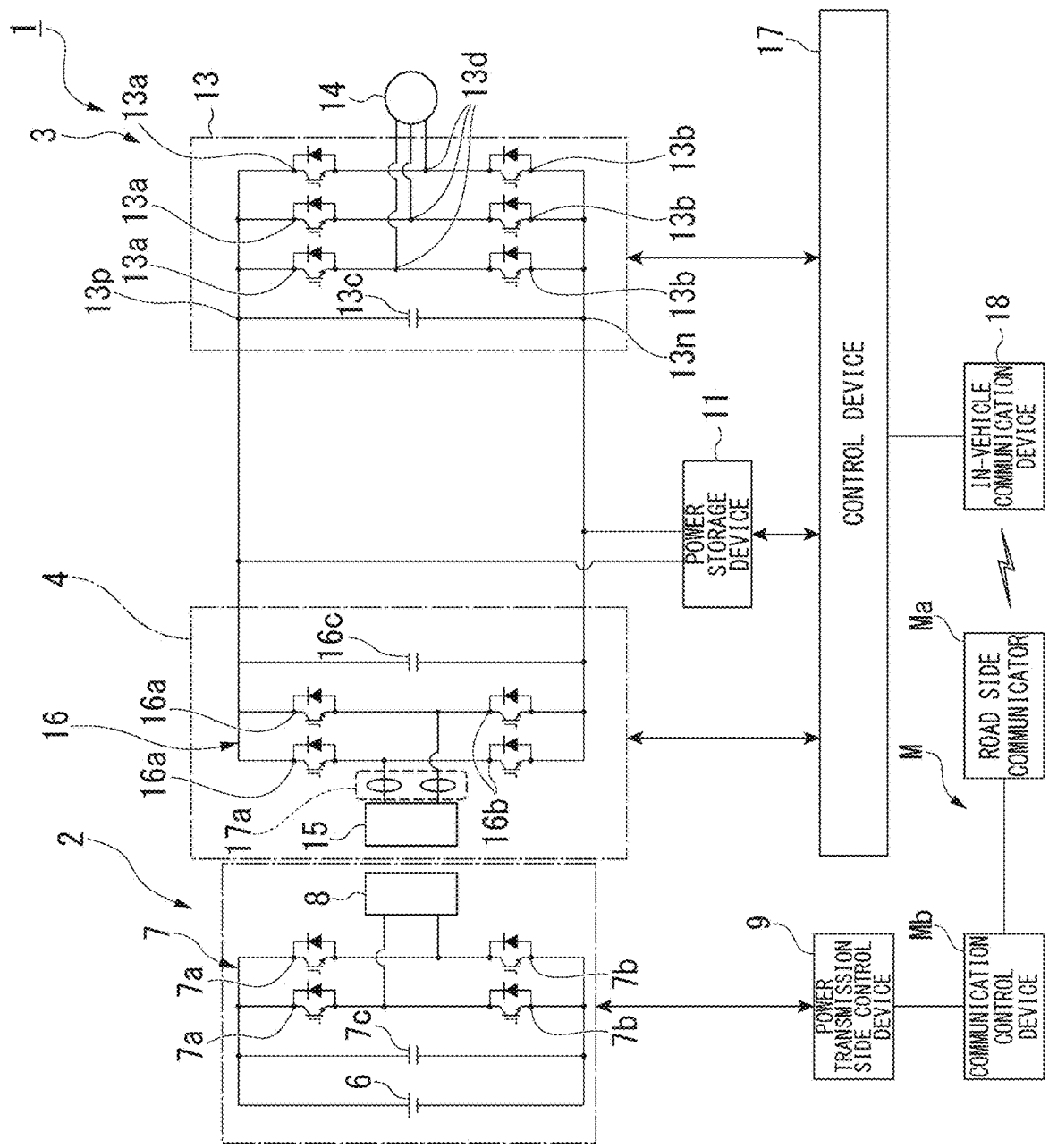
FIG. 2 is a view showing a detailed constitution of the non-contact power transmission system of the embodiment of the present invention.
Figure 3:
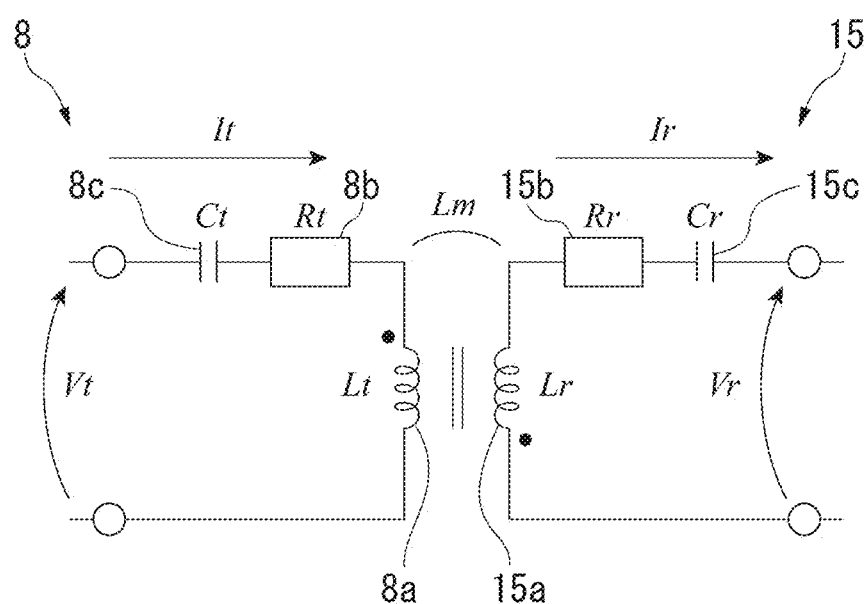
FIG. 3 is a view showing constitutions of a power transmission unit and a power reception unit of the non-contact power transmission system according to the embodiment of the present invention.

FIGS. 1 and 2 are views showing constitutions of a non-contact power transmission system 1 according to the embodiment. FIG. 3 is a view showing constitutions of a power transmission unit 8 and a power reception unit 15 of the non-contact power transmission system 1 according to the embodiment.

For example, the non-contact power transmission system 1 according to the embodiment supplies power to a moving object such as a vehicle from outside the moving object through non-contact power transmission. For example, the vehicle is an electrically-driven vehicle such as an electric vehicle, a hybrid vehicle, or a fuel cell vehicle.

(Non-Contact Power Transmission System)

As shown in FIGS. 1 and 2, for example, the non-contact power transmission system 1 according to the embodiment includes power transmission devices 2 installed on a traveling road or the like of a vehicle, a drive control device 3 and a power reception device 4 mounted in a moving object such as a vehicle, and a communication system M. The non-contact power transmission system 1 according to the embodiment may simply include at least constituent elements (for example, the drive control device 3 and the power reception device 4) mounted in a moving object, or non-contact power transmission may be executed by a combination of constituent elements outside a moving object (for example, the power transmission device 2 and the communication system M) and the non-contact power transmission system 1 mounted in the moving object.

For example, the communication system M includes at least one road side communicator Ma and a communication control device Mb. For example, the communication system M constitutes at least a part of a system for performing electronic toll collection, such as an electronic toll collection system (ETC) on a toll road.

For example, the road side communicators Ma are disposed away from each other by a predetermined distance on an upstream side of a coupling section (a communication section and a power transmission section) (which will be described below) on a traveling road or the like of a vehicle. The road side communicators Ma each include an antenna or the like for wireless communication and perform wireless communication with an in-vehicle communication device 18 (which will be described below) mounted in a moving object such as a vehicle. For example, if information required for charging and payment for power transmission from the power transmission device 2 to a moving object such as a vehicle is acquired from the in-vehicle communication device 18, the road side communicators Ma transmit key information required to start power transmission and information related to installation of the power transmission device 2 to the in-vehicle communication device 18. For example, information required for charging and payment is information unique to a moving object such as a vehicle, such as the presence or absence of an IC card for toll collection, an in-vehicle transponder, or the like, and an identifier. For example, the key information is information generated while being updated in a predetermined cycle such that it varies for each authorized moving object (namely, a vehicle or the like that is permitted to execute power transmission) passing through a predetermined power transmission section. The key information is information required for the power transmission device 2 to authenticate the power reception device 4 (which will be described below) of a moving object such as a vehicle. For example, the information related to installation of the power transmission device 2 is information of an installation interval of (which will be described below) a plurality of power transmission units 8, and the like.

The communication control device Mb controls operation of all the road side communicators Ma that are associated in advance. For example, the communication control device Mb is a software functional unit functioning when a processor such as a central processing unit (CPU) executes a predetermined program. The software functional unit is an ECU including a processor such as a CPU, a read only memory (ROM) storing a program, a random access memory (RAM) transitorily storing data, and an electronic circuit such as a timer. At least a part of the communication control device Mb may be an integrated circuit such as a large scale integration (LSI).

For example, the communication control device Mb attempts to acquire the information required for charging and payment through communication between the road side communicator Ma and the in-vehicle communication device 18 of a surrounding moving object such as a vehicle in a predetermined cycle or the like. If the information required for charging and payment is acquired from the in-vehicle communication device 18 and it is confirmed that electronic payment is available, the communication control device Mb transmits permission information indicating that electronic payment is available and the key information required to start power transmission to the in-vehicle communication device 18. When the key information is transmitted from the road side communicator Ma to the in-vehicle communication device 18, the communication control device Mb transmits the same key information to a power transmission side control device 9 (which will be described below).

For example, the power transmission device 2 includes a power source unit 6, a transmission power conversion unit 7, the power transmission unit 8, and the power transmission side control device 9. For example, the power transmission device 2 may include at least a plurality of power transmission units 8 in a predetermined coupling section on a traveling road or the like of a vehicle.

For example, the power source unit 6 includes an AC power source such as a commercially available power source, an AC-DC converter converting AC power into DC power, and a power smoothing capacitor. The power source unit 6 converts AC power supplied from the AC power source into DC power through the AC-DC converter.

For example, the transmission power conversion unit 7 includes an inverter converting DC power into AC power. For example, the inverter of the transmission power conversion unit 7 includes a bridge circuit formed using a plurality of switching elements and rectification elements that are bridge-connected in two phases, and a voltage smoothing capacitor. For example, each of the switching elements is a transistor such as a silicon carbide (SiC) metal oxide semi-conductor field effect transistor (MOSFET). The plurality of switching elements are transistors 7a and 7b of a high side arm and a low side arm forming a pair in each phase. For example, the rectification elements are reflux diodes connected to the respective transistors 7a and 7b in parallel. A voltage smoothing capacitor 7c is connected to the bridge circuit in parallel.

For example, the power transmission unit 8 sends power due to change in high-frequency magnetic field through magnetic field coupling such as magnetic field resonance or electromagnetic induction. As shown in FIG. 3, for example, the power transmission unit 8 includes a resonance circuit formed using a primary side coil 8a, a primary side resistance 8b, and a primary side capacitor 8c that are connected in series.

For example, the power transmission unit 8 includes a sensor such as a current sensor for detecting a current It flowing in the resonance circuit.

The power transmission side control device 9 controls the power transmission devices 2 in an integrated manner. For example, the power transmission side control device 9 is a software functional unit functioning when a processor such as a central processing unit (CPU) executes a predetermined program. The software functional unit is an ECU including a processor such as a CPU, a read only memory (ROM) storing a program, a random access memory (RAM) transitorily storing data, and an electronic circuit such as a timer. At least a part of the power transmission side control device 9 may be an integrated circuit such as a large scale integration (LSI).

For example, the power transmission side control device 9 performs power transmission to the power reception device 4 of a vehicle by controlling ON (conductive) and OFF (cut-off) of each of the switching elements of the transmission power conversion unit 7 in accordance with information of a drive frequency set in advance or a required frequency received from the power reception device 4.

For example, if the key information is received from the communication control device Mb, the power transmission side control device 9 ascertains that the same key information is to be transmitted from the road side communicator Ma to the in-vehicle communication device 18 of a moving object and shifts the power transmission device 2 from a halt state to a reception standby state. For example, the halt state of the power transmission device 2 is a state in which a switching operation in the transmission power conversion unit 7 is halted such that each of the switching elements of the transmission power conversion unit 7 is maintained OFF (cut-off), or the like. The reception standby state of the power transmission device 2 is a state in which transmission of information from the power reception device 4 of a moving object such as a vehicle is detected. For example, the reception standby state of the power transmission device 2 is a short-circuited state of the transmission power conversion unit 7.

When the transmission power conversion unit 7 is in the short-circuited state, the power transmission side control device 9 causes the primary side coil 8a to be short-circuited by setting ON for the transistor 7b of the low side arm of each phase. Accordingly, when the primary side power transmission device 2 is viewed from the secondary side power reception device 4, a primary side impedance has an extremely large value. However, if a magnetic field is generated by a secondary side coil 15a of the power reception device 4 at the time of PING transmission (which will be described below), communication from the power reception device 4 is detected by a voltage induced into the primary side coil 8a of the power transmission device 2.

For example, if the key information and information of a required frequency for power transmission or the like are received from the power reception device 4, the power transmission side control device 9 compares the key information received from the communication control device Mb and the key information received from the power reception device 4 with each other. When the pieces of key information coincide with each other, the power transmission side control device 9 shifts the power transmission device 2 from the reception standby state to a power transmission state. For example, the power transmission state of the power transmission device 2 is a state in which power transmission is performed at the required frequency of the power reception device 4.

As shown in FIGS. 1 and 2, for example, the drive control device 3 of a moving object such as a vehicle includes a power storage device 11, a power conversion unit 13, and a rotary electric machine 14. For example, the power reception device 4 of a moving object includes the power reception unit 15 and a received power conversion unit 16. For example, the drive control device 3 and the power reception device 4 include a common control device 17. For example, the control device 17 includes the in-vehicle communication device 18.

The power storage device 11 is connected to the power conversion unit 13 and the received power conversion unit 16 (which will be described below). The power storage device 11 is charged by means of power transmitted from the power transmission device 2 outside the vehicle in a non-contact manner. The power storage device 11 transfers power with respect to the rotary electric machine 14 via the power conversion unit 13.

For example, the power storage device 11 includes a battery such as a lithium-ion battery, a current sensor for detecting a battery current, and a voltage sensor for detecting a battery voltage.

The power conversion unit 13 is connected to the rotary electric machine 14. For example, the power conversion unit 13 includes a power converter performing conversion between DC power and AC power. For example, the power converter includes a second element module and a voltage smoothing capacitor.

For example, the second element module includes a second bridge circuit formed using a plurality of switching elements and rectification elements that are bridge-connected in three phases. For example, each of the switching elements is a transistor such as a SiC MOSFET. The plurality of switching elements are transistors 13a and 13b of the high side arm and the low side arm forming a pair in each phase. For example, the rectification elements are reflux diodes connected to the respective transistors 13a and 13b in parallel. A voltage smoothing capacitor 13c is connected to the second bridge circuit in parallel.

The second element module controls operation of the rotary electric machine 14 through transfer of power. For example, during power running of the rotary electric machine 14, the second element module converts DC power input from positive and negative DC terminals 13p and 13n into three-phase AC power and supplies three-phase AC power from a three-phase AC terminal 13d to the rotary electric machine 14. The second element module generates a rotational drive force by sequentially commutating electrification to a three-phase stator winding wire of the rotary electric machine 14.

For example, at the time of regeneration of the rotary electric machine 14, the second element module converts three-phase AC power input through the three-phase stator winding wire into DC power by driving between ON (conductive) and OFF (cut-off) of the switching elements of each phase synchronized with rotation of the rotary electric machine 14. The second element module can supply DC power converted from three-phase AC power to the power storage device 11.

For example, the rotary electric machine 14 is a three-phase AC brushless DC motor provided for traveling driving of the vehicle. The rotary electric machine 14 includes a rotor having a permanent magnet for a magnetic field, and a stator having a three-phase stator winding wire for generating a rotating magnetic field rotating the rotor. The three-phase stator winding wire is connected to the three-phase AC terminal 13*d* of the power conversion unit 13.

The rotary electric machine 14 generates a rotational drive force by performing a power running operation using power supplied from the power conversion unit 13. For example, the rotary electric machine 14 generates a traveling drive force by performing a power running operation using power supplied from the power conversion unit 13 when it can be coupled to wheels of the vehicle. The rotary electric machine 14 may generate generated power by performing a regenerative operation using rotational power input from the wheel side of the vehicle. The rotary electric machine 14 may generate power using motive power of an internal-combustion engine of the vehicle when it can be coupled to the internal-combustion engine.

The power reception unit 15 is connected to the received power conversion unit 16. For example, the power reception unit 15 receives power due to change in high-frequency magnetic field transmitted from the power transmission units 8 through magnetic field coupling such as magnetic field resonance or electromagnetic induction. As shown in FIG. 3, for example, the power reception unit 15 includes a resonance circuit formed using the secondary side coil 15*a*, a secondary side resistance 15*b*, and a secondary side capacitor 15*c* that are connected in series. For example, the power reception unit 15 includes a sensor such as a current sensor for detecting a current Ir flowing in the resonance circuit.

The received power conversion unit 16 shown in FIGS. 1 and 2 is connected to the power conversion unit 13. The received power conversion unit 16 includes a so-called full bridgeless-type (or a bridgeless-type or a totem pole-type) power factor correction (PFC) circuit that converts AC power into DC power. A so-called bridgeless PFC is a PFC including no bridge rectifier constituted of a plurality of bridge-connected diodes, and a so-called totem pole PFC is a PFC including a pair of switching elements of the same conductivity type connected in series (totem pole connected) in the same direction.

For example, the received power conversion unit 16 includes a third bridge circuit formed using a plurality of switching elements and rectification elements that are bridge-connected in two phases, and a voltage smoothing capacitor. For example, each of the switching elements is a transistor such as a SiC MOSFET. The plurality of switching elements are transistors 16*a* and 16*b* of the high side arm and the low side arm forming a pair in each phase. For example, the rectification elements are reflux diodes connected to the respective transistors 16*a* and 16*b* in parallel. A voltage smoothing capacitor 16*c* is connected to the third bridge circuit in parallel.

For example, the power reception device 4 including the power reception unit 15 and the received power conversion unit 16 receives power transmitted from the power transmission device 2 by controlling ON (conductive) and OFF (cut-off) of each of the switching elements of the received power conversion unit 16 in accordance with information of the frequency of power transmission of the power transmission device 2.

For example, the control device 17 controls the drive control device 3, the power reception device 4, and the in-vehicle communication device 18 of a moving object such as a vehicle in an integrated manner. For example, the control device 17 is a software functional unit functioning when a processor such as a central processing unit (CPU) executes a predetermined program. The software functional unit is an ECU including a processor such as a CPU, a read only memory (ROM) storing a program, a random access memory (RAM) transitorily storing data, and an electronic circuit such as a timer. At least a part of the control device 17 may be an integrated circuit such as a large scale integration (LSI).

For example, the control device 17 generates a control signal indicating a timing of driving each of the switching elements between ON (conductive) and OFF (cut-off) and generates a gate signal for actually driving ON and OFF of each of the switching elements on the basis of a control signal.

For example, the control device 17 performs power factor correction of an input voltage and an input current while rectifying AC power received from the power transmission device 2 into DC power by controlling switching of each of the switching elements of the power reception device 4.

For example, the control device 17 controls switching operations of the plurality of switching elements of the received power conversion unit 16 on the basis of a detection value of a current output from a current sensor 17*a* detecting a current flowing between the power reception unit 15 and the received power conversion unit 16.

For example, the control device 17 controls an output corresponding to a target output through a synchronous rectification operation of synchronously driving ON and OFF of the plurality of switching elements of the power reception device 4 and a short circuit operation of short-circuiting the secondary side coil 15*a*.

For example, the control device 17 controls the synchronous rectification operation in accordance with the magnitude and the phase of a current generated in the power reception unit 15 by means of power sent from the power transmission device 2, namely, the current Ir flowing in the secondary side coil 15*a*. The control device 17 controls the plurality of switching elements of the received power conversion unit 16 through soft switching of so-called zero voltage switching (ZVS). In zero voltage switching (ZVS), voltages at both ends of each of the switching elements are set to zero and then turning-on (switching from an OFF state to an ON state) is executed through discharging of an output capacitance (parasitic capacitance) in the OFF state during a dead time period of each phase.

For example, the control device 17 controls the short circuit operation by turning on only the low side arm of each phase while continuing the synchronous rectification operation of zero voltage switching (ZVS) in the high side arm of each phase of the received power conversion unit 16. The control device 17 increases the secondary side impedance when the secondary side power reception device 4 is viewed from the primary side power transmission device 2 and reduces the primary side current (power transmission current: the current It flowing in the primary side coil 8*a*) by short-circuiting the secondary side coil 15*a*. The control device 17 executes independent power control such as halting power transmission on the power reception device 4 side by controlling a current of the primary side power transmission device 2 using the secondary side power reception device 4.

For example, the control device 17 sets a communication section for communication and a power transmission section for power transmission in a coupling section in which a coupling degree between the primary side coil 8a of the power transmission device 2 and the secondary side coil 15a of the power reception device 4 near the power transmission device 2 is equal to or larger than a predetermined degree. For example, if the key information is received through communication between the road side communicator Ma and the in-vehicle communication device 18 before arrival at the coupling section, the control device 17 sends information related to power transmission in the power transmission section from the power reception device 4 to the power transmission device 2 in the communication section prior to start of power transmission by the power transmission device 2 in the power transmission section.

For example, when a first communication section and a second communication section are set in the front and the rear of the power transmission section in a movement direction of a moving object (for example, a vehicle V), the control device 17 sends information related to power transmission from the power reception device 4 to the power transmission device 2 in the first communication section that is the foremost communication section.

For example, information related to power transmission is key information acquired from the road side communicator Ma, a required frequency for power transmission, a target output (power consumption) for fail-safe, information related to various abnormalities, and the like.

For example, a required frequency for power transmission is set such that degradation in efficiency of power transmission and output (power) is curbed on the basis of the lowest ground clearance of a moving object related to the distance between the primary side coil 8a and the secondary side coil 15a, the mounting layout of the power reception device 4 in the moving object, and the like. The control device 17 may set a required frequency in accordance with the state of power transmission between the power transmission device 2 and the power reception device 4.

For example, when the primary side coil 8a is present in the last communication section (for example, the second communication section or the like) of the coupling section, the control device 17 may send information indicating a halt of each of power transmission in the power transmission section and communication in the communication section from the power reception device 4 to the power transmission device 2 through communication between the power transmission device 2 and the power reception device 4.

For example, when the key information is received through communication between the road side communicator Ma and the in-vehicle communication device 18, the control device 17 transmits information by performing power transmission from the power reception device 4 to the power transmission device 2 in the reception standby state as transmission of a so-called PING signal in the communication section of the coupling section. The power reception device 4 performs communication using a voltage induced into the primary side coil 8a of the power transmission device 2 due to a magnetic field generated in the secondary side coil 15a by an electrification switching operation of switching in the received power conversion unit 16. For example, the control device 17 executes PING transmission by generating so-called two-level (dominant and recessive) digital signals through switching of carrier waves for transmitting power from the power reception device 4 to the power transmission device 2 in a non-contact manner at a predetermined duty ratio. For example, the predetermined duty ratio is approximately 50% from a predetermined smallest value. For example, the control device 17 may transmit information through amplitude modulation of carrier waves by changing the switching duty ratio.

The control device 17 performs PING transmission in a predetermined cycle, such as approximately several tens of us to several ms, for example, and starts power reception control with respect to power transmission from the power transmission device 2 in the power transmission section upon reception of a response signal with respect to PING transmission from the power transmission device 2.

The control device 17 sets a timing of PING transmission in accordance with the information related to installation of the power transmission device 2 received from the road side communicator Ma and the movement state (namely, the movement state of the power reception device 4) of a moving object (for example, the vehicle V), for example, such that communication between the power transmission device 2 and the power reception device 4 in the communication section (namely, transmission and reception therebetween) is properly completed. For example, the control device 17 sets a transmission cycle in accordance with information of the installation interval of the plurality of power transmission units 8 and the like, and the speed of a moving object (for example, the vehicle speed or the like of the vehicle V) such that at least a predetermined number of times (once or the like) of PING transmission is completed in the communication section.

For example, even when execution of PING transmission in the communication section is permitted, the control device 17 shifts to the standby state in which execution of PING transmission is halted outside the communication section. For example, in the standby state of PING transmission, the control device 17 may start execution of PING transmission immediately before arrival at the foremost communication section of the next coupling section in response to movement of a moving object.

Hereinafter, regarding operation of the non-contact power transmission system 1, processing executed by the power transmission side control device 9 and the control device 17 will be described.

Figure 4:
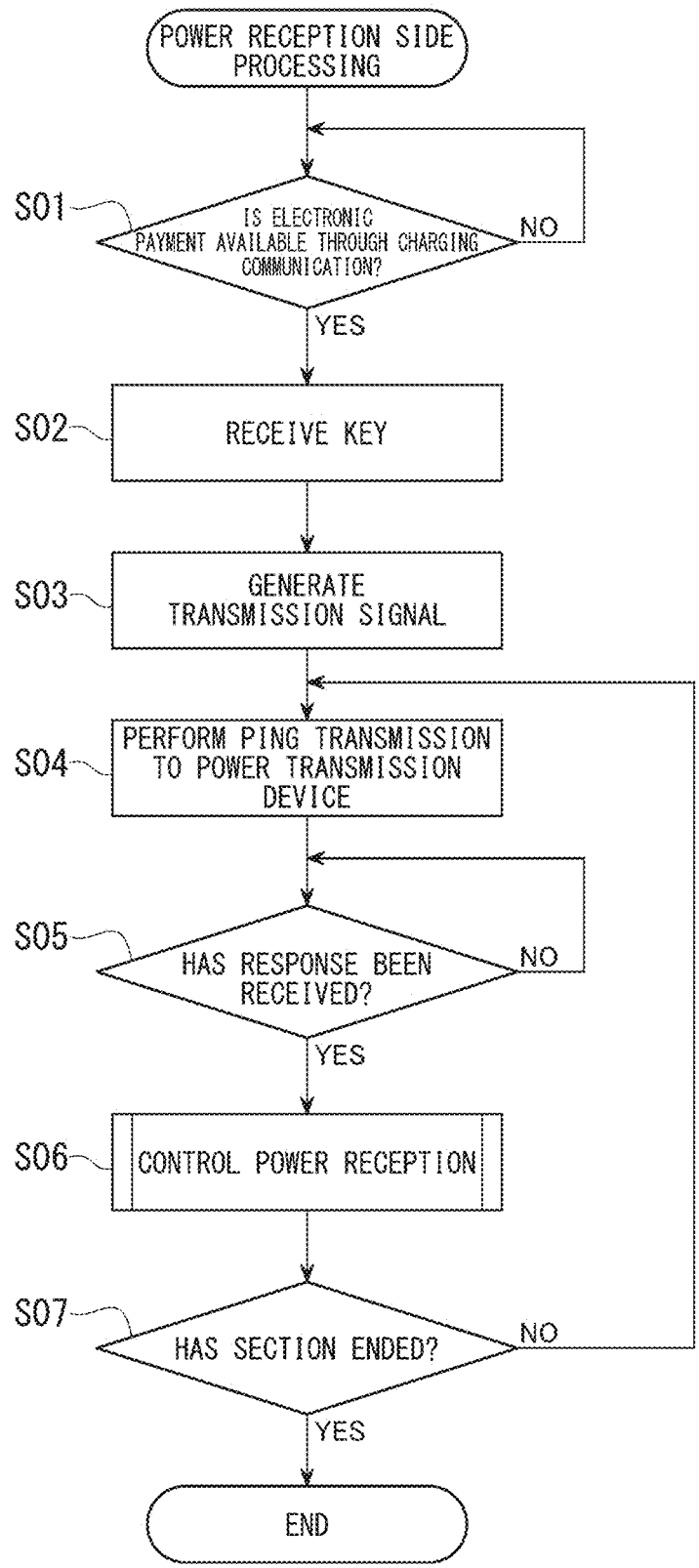
FIG. 4 is a flowchart showing power reception side processing of the non-contact power transmission system according to the embodiment of the present invention.

FIG. 4 is a flowchart showing power reception side processing executed by the control device 17 of the non-contact power transmission system 1 according to the embodiment.

First, in Step S01 shown in FIG. 4, the control device 17 judges whether or not electronic payment for power transmission from the power transmission device 2 to a moving object is available by transmitting and receiving information through wireless communication between the road side communicator Ma and the in-vehicle communication device 18 (charging communication). When this judgment result is "NO", the control device 17 repeats the processing of Step S01. Meanwhile, when this judgment result is "YES", the control device 17 proceeds to the processing of Step S02.

Further, in Step S02, the control device 17 acquires the key information required to start power transmission from the road side communicator Ma.

Next, in Step S03, the control device 17 generates a signal for PING transmission through power transmission from the power reception device 4 to the power transmission device 2.

Next, in Step S04, the control device 17 executes PING transmission in a predetermined cycle in the foremost communication section of the coupling section.

Next, in Step S05, the control device 17 judges whether or not a response signal from the power transmission device 2 with respect to PING transmission has been received. When this judgment result is "NO", the control device 17 repeats the processing of Step S05. Meanwhile, when this judgment result is "YES", the control device 17 proceeds to the processing of Step S06.

Further, in Step S06, the control device 17 starts power reception control (which will be described below) with respect to power transmission from the power transmission device 2 in the power transmission section.

Next, in Step S07, the control device 17 judges whether or not the coupling section has ended. When this judgment result is "NO", the control device 17 returns to Step S04. Meanwhile, when this judgment result is "YES", the control device 17 proceeds to end the processing.

Figure 5:
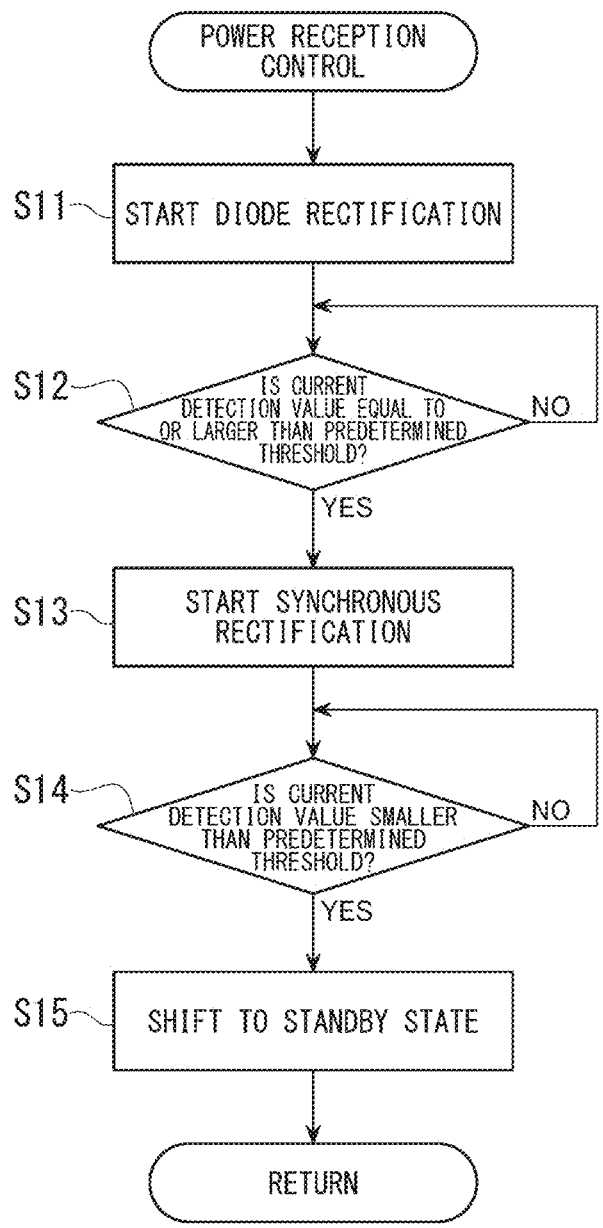
FIG. 5 is a flowchart of power reception control shown in FIG. 4.

FIG. 5 is a flowchart of power reception control shown in FIG. 4.

First, in Step S11 shown in FIG. 5, the control device 17 starts magnetic resonance coupling of the power transmission unit 8 and the power reception unit 15 by permitting a diode rectification operation of the power reception device 4. The diode rectification operation is a full wave rectification operation performed by rectification elements (reflux diodes connected to the respective transistors 16*a* and 16*b* in parallel) of the third bridge circuit of the received power conversion unit 16.

Next, in Step S12, the control device 17 judges whether or not the detection value of a current output from the current sensor 17*a* is equal to or larger than a predetermined threshold. When this judgment result is "NO", the control device 17 repeats the processing of Step S12. Meanwhile, when this judgment result is "YES", the control device 17 proceeds to the processing of Step S13. For example, the predetermined threshold is set in accordance with output classification or the like of the received power conversion unit 16.

Next, in Step S13, the control device 17 starts the synchronous rectification operation of the power reception device 4. For example, every time the phase of the detection value of a current output from the current sensor 17*a* crosses zero (0°), the control device 17 inverts the pulse instructing driving of the high side arm of the received power conversion unit 16 and the pulse instructing driving of the low side arm.

Next, in Step S14, the control device 17 judges whether or not the detection value of a current output from the current sensor 17*a* is smaller than the predetermined threshold. When this judgment result is "NO", the control device 17 repeats the processing of Step S14. Meanwhile, when this judgment result is "YES", the control device 17 proceeds to the processing of Step S15.

Further, in Step S15, the control device 17 halts the synchronous rectification operation of the power reception device 4 and permits the diode rectification operation of the power reception device 4. The control device 17 shifts the power reception device 4 to the standby state in accordance with predetermined conditions after the shift from the synchronous rectification operation to the diode rectification operation. In the standby state of the power reception device 4, for example, the control device 17 controls a current of the primary side power transmission device 2 so as to reduce the output, halt power transmission, or the like through the short circuit operation of short-circuiting the secondary side coil 15*a*. Further, the control device 17 proceeds to return the processing.

Figure 6:
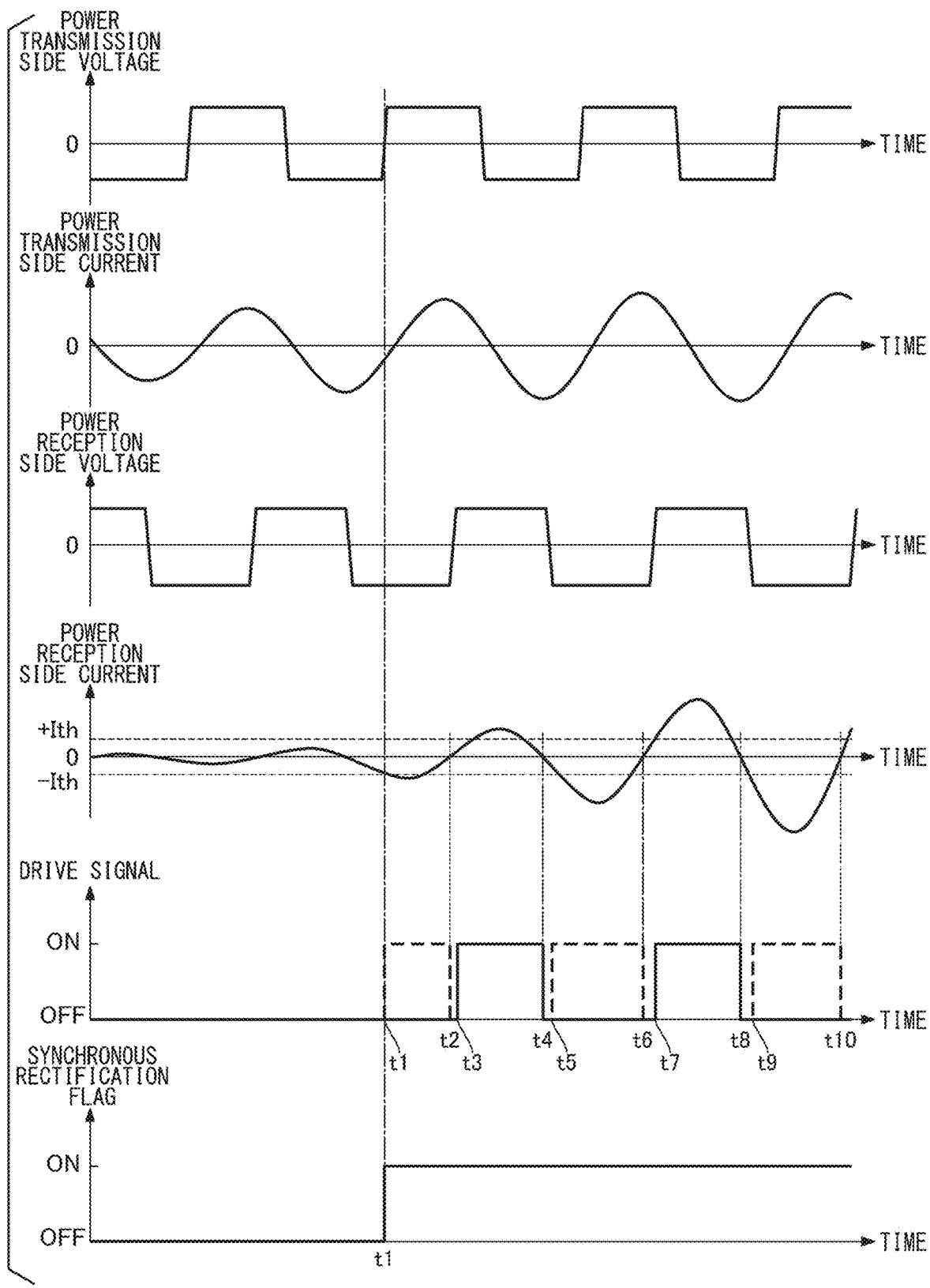
FIG. 6 is a view showing an example of a correspondence of a power transmission side voltage, a power transmission side current, a power reception side voltage, a power reception side current, a drive signal, and a synchronous rectification flag in the non-contact power transmission system of the embodiment of the present invention.

FIG. 6 is a view showing an example of a correspondence of a power transmission side voltage, a power transmission side current, a power reception side voltage, a power reception side current, a drive signal, and a synchronous rectification flag in the non-contact power transmission system 1 according to the embodiment.

First, for example, before a time t1 shown in FIG. 6, after power transmission control of the power transmission device 2 has started in accordance with PING transmission from the power reception device 4 to the power transmission device 2, the amplitude of a secondary side current (power reception side current: for example, a current detected by the current sensor 17*a*, or the like) gradually increases through the diode rectification operation of the power reception device 4.

Further, for example, when the power reception side current exceeds a predetermined threshold Ith at the time t1, the synchronous rectification operation of the power reception device 4 is started in response to change of the flag value of the synchronous rectification flag from "0" to "1". For example, the predetermined threshold Ith of the power reception side current is set with respect to a steady state in which a current amplitude that gradually increases in accordance with start of the diode rectification operation becomes constant after a moderate time.

In the synchronous rectification operation after the time t1, for example, as indicated at each of times t2, t4, t6, t8, and t10, every timing the phase of the waveform of the power reception side current crosses zero (0°), the pulse instructing driving of the low side arm of the received power conversion unit 16 (drive signal: dotted line) or the pulse instructing driving of the high side arm (drive signal: solid line) is inverted from ON to OFF. In addition, for example, as indicated at each of times t3, t5, t7, and t9, a drive signal of the low side arm of the received power conversion unit 16 (dotted line) and a drive signal of the high side arm (solid line) are alternately switched from ON to OFF individually and then are inverted from OFF to ON after a predetermined delay time corresponding to an internal inductance value or the like. The waveform of the power reception side current exhibits a sinusoidal wave shape through the synchronous rectification operation in a section of 180°.

Figure 7:
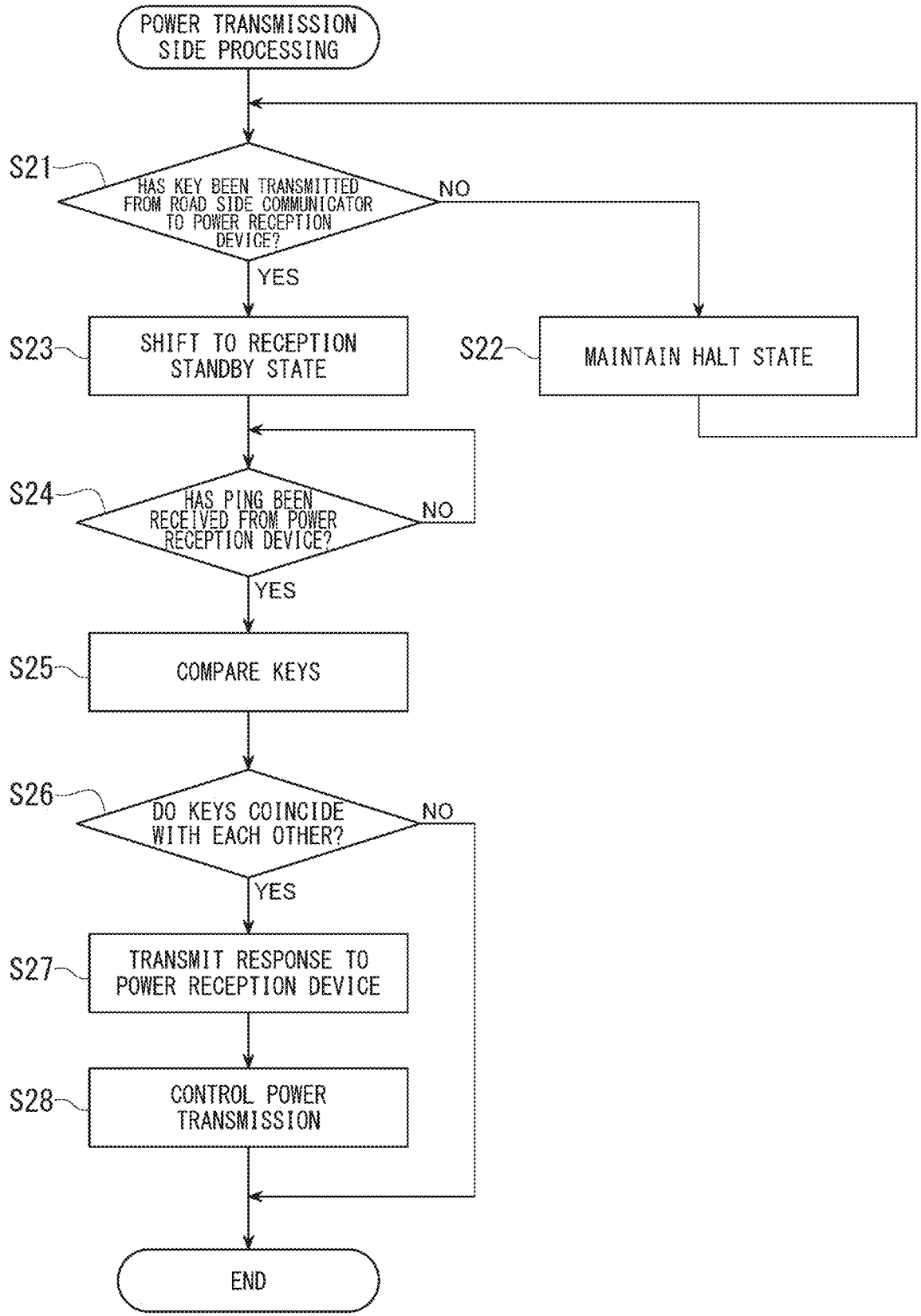
FIG. 7 is a flowchart showing power transmission side processing of the non-contact power transmission system according to the embodiment of the present invention.

FIG. 7 is a flowchart showing power transmission side processing executed by the power transmission side control device 9 of the non-contact power transmission system 1 according to the embodiment.

First, in Step S21 shown in FIG. 7, the power transmission side control device 9 judges whether or not the key information has been transmitted from the road side communicator Ma to the power reception device 4. When this judgment result is "NO", the power transmission side control device 9 proceeds to the processing of Step S22. Meanwhile, when this judgment result is "YES", the power transmission side control device 9 proceeds to the processing of Step S23.

Further, in Step S22, the power transmission side control device 9 maintains the halt state of the power transmission device 2 and returns to the processing of Step S21.

Further, in Step S23, the power transmission side control device 9 shifts the power transmission device 2 from the halt state to the reception standby state.

Next, in Step S24, the power transmission side control device 9 judges whether or not a PING signal has been received through power transmission from the power reception device 4 to the power transmission device 2 in the foremost communication section of the coupling section. When this judgment result is "NO", the power transmission side control device 9 repeats the processing of Step S24. Meanwhile, when this judgment result is "YES", the power transmission side control device 9 proceeds to the processing of Step S25.

Next, in Step S25, the power transmission side control device 9 compares the key information received from the communication control device Mb and the key information received from the power reception device 4 with each other.

Next, in Step S26, the power transmission side control device 9 judges whether or not the key information received from the communication control device Mb and the key information received from the power reception device 4 coincide with each other. When this judgment result is "NO", the power transmission side control device 9 proceeds to end the processing. Meanwhile, when this judgment result is "YES", the power transmission side control device 9 proceeds to the processing of Step S27.

Next, in Step S27, the power transmission side control device 9 transmits a response signal with respect to PING transmission to the power reception device 4 through power transmission from the power transmission device 2 to the power reception device 4 in the communication section.

Next, in Step S28, the power transmission side control device 9 starts power transmission control with respect to power transmission to the power reception device 4 in the power transmission section at a required frequency received from the power reception device 4. Further, the control device 17 proceeds to end the processing.

As described above, according to the non-contact power transmission system 1 of the embodiment, a loss in a power reception side rectification operation and a required cooling capability can be reduced by starting the synchronous rectification operation in accordance with the predetermined threshold Ith of the power reception side current and including the control device 17 controlling the switching operation in accordance with the phase of the power reception side current.

Since drive signals of the low side arm and the high side arm are alternately inverted every timing the phase of the waveform of the power reception side current crosses zero (0°), the waveform of the power reception side current can exhibit a sinusoidal wave shape in the section of 180°, and efficiency of power conversion can be improved. For example, compared to when inversion of driving vibration is switched depending on whether or not the power reception side current exceeds the predetermined threshold, the duty ratio of power conversion can be increased, and an output can be improved.

It is possible to switch between the diode rectification operation and the synchronous rectification operation in accordance with the predetermined threshold Ith of the power reception side current, and therefore the synchronous rectification operation can be appropriately executed even when a moving object such as a vehicle equipped with the power reception device 4 is moving.

The synchronous rectification operation can be halted and a shift to the standby state can be performed when a moving object such as a vehicle equipped with the power reception device 4 leaves the power transmission section, and therefore appropriate operation switching can be performed.

MODIFICATION EXAMPLE

According to the embodiment described above, for example, in the case of a hybrid vehicle or the like that is driven by the power storage device 11 and an internal-combustion engine as motive power sources, the non-contact power transmission system 1 may include a storage voltage conversion unit converting input/output power of the power storage device 11.

The embodiment of the present invention is presented as an example and is not intended to limit the scope of the invention. The embodiment can be performed in various other forms, and various omissions, replacements, and changes can be made within a range not departing from the gist of the invention. The embodiment and modifications thereof are included in the invention described in the claims and the scope equivalent thereto as they are included in the scope and the gist of the invention.

What is claimed is:

1. A non-contact power transmission system comprising:
a power reception unit that has a coil for receiving AC power transmitted in a non-contact manner from a power transmission device;
a power conversion unit that has a plurality of switching elements and a plurality of rectification elements connected to the coil and converts the AC power received by the power reception unit into DC power;
a current sensor that detects a current flowing between the power reception unit and the power conversion unit; and
a control device that controls switching operations of the plurality of switching elements on the basis of a detection value of the current output from the current sensor,
wherein the control device causes the power conversion unit to execute a synchronous rectification operation of rectifying the AC power by synchronously driving the plurality of switching elements in accordance with a phase of the current when the detection value of the current is equal to or larger than a predetermined threshold; and
wherein the control device prohibits the synchronous rectification operation and permits an operation of rectifying the AC power using the plurality of rectification elements when the detection value of the current is smaller than the predetermined threshold.

2. The non-contact power transmission system according to claim 1,
wherein the control device halts the synchronous rectification operation and shifts the power reception unit and the power conversion unit to a standby state when the detection value of the current is smaller than the predetermined threshold while the synchronous rectification operation is executed.

* * * * *